United States Patent
Atkinson et al.

[19]

[11] Patent Number: 5,886,840
[45] Date of Patent: Mar. 23, 1999

[54] OPTICAL TURF EVALUATION DEVICE AND METHOD OF USE

[75] Inventors: Dale A. Atkinson, Minneapolis; Daniel E. Peterson, Northfield; John F. Klos, Minneapolis, all of Minn.

[73] Assignee: The Toro Company, Bloomington, Minn.

[21] Appl. No.: 767,090

[22] Filed: Dec. 13, 1996

[51] Int. Cl.⁶ .................................................... G02B 7/182

[52] U.S. Cl. .......................... 359/871; 359/872; 359/873; 108/44

[58] Field of Search ...................................... 359/871, 872, 359/873; 108/44; 116/202, 229, 235

[56] References Cited

U.S. PATENT DOCUMENTS 5,116,058  5/1992  Theriault .............................. 273/182 E
5,363,231  11/1994  Komori .................................... 359/872

OTHER PUBLICATIONS

Line drawing labeled: "Joe's Check Gage #1" and For measuring quality of cut, believed to be dated Aug. 13, 1970.
Line drawing labeled: "Joe's Check Gage #2" and For measuring quality of cut, believed to be dated Aug. 13, 1970.
Line drawing of Figure 1 of the Applicant's disclosure and discussion of Figure 1 in the Applicant's specification at p. 2, line 17–p. 3, line 17.

*Primary Examiner*—Cassandra Spyrou
*Assistant Examiner*—Mohammad Y. Sikder
*Attorney, Agent, or Firm*—Larkin, Hoffman, Daly & Lindgren, Ltd.

[57] ABSTRACT

An evaluation tool for viewing local and remote irregularities in a turf surface. The tool includes a body structure having first and second turf engaging surfaces for supporting the body structure upon the turf surface in first and second inspection orientations. The tool further includes a reflector element to provide a view of a local turf segment to a user viewing from above when the body is in the first inspection orientation and a view of a remote turf segment when in the second inspection orientation. Indicia may be provided upon the tool for indicating vertical distances.

17 Claims, 6 Drawing Sheets

OPTICAL TURF EVALUATION DEVICE AND METHOD OF USE

FIELD OF THE INVENTION

The present invention generally relates to a turf evaluation tool, and more particularly to a compact device and method of use permitting a user viewing from above to scan for and quantify turf incongruities.

BACKGROUND OF THE INVENTION

Landscaping and lawn maintenance crews, particularly golf course turf maintenance personnel, use a variety of powered rotary cutters for the rapid removal of grass, weeds, and other low height vegetation. Greensmowers are well known in the turf care industry for cutting grass at the extremely low heights of cut required on golf greens. Modern greensmowers are available in a variety of configurations, including a walk behind type that has a single cutting unit and a riding type that has two or more cutting units. The Greensmaster 3000® is a riding type greensmower that has three identical transversely mounted cutting units and is manufactured by The Toro Company, the assignee of this invention.

It is especially important that the aftercut appearance and condition of a golf green be relatively free of incongruities or defects left by the cutting unit. "Stragglers" are one type of defect and are grass left uncut or undercut by the cutting unit and thus appear at a greater height than neighboring grass blades. "Ridges" are another type of defect that may be left by multiple cutting unit mowers where the adjacent cutting units are not precisely set to cut at the same height. "Clip" or "bobbing" marks are patterned or wavy turf defects generally transversely aligned to the direction of mower travel, usually resulting from improper machine operation or adjustment. All of these turf defects may influence the appearance or playability of golf course greens. In order to maintain an accurate and true playing green relatively free of these defects, an inspection of the aftercut appearance of the greens may be required. Furthermore, by performing a routine turf inspection and assessment for "stragglers," "ridges" and the like, greenskeeping personnel may be able to discern the efficiency and performance of the greensmowing equipment. A turf inspection for defects also provides an important diagnostic opportunity to reveal improper turf maintenance practices and/or improper machine operation.

In the past, inspection of golf greens for "stragglers," "ridges," and the like that may effect the play of the ball included a primarily visual method wherein the inspector assumed a prone, or generally prone position with his/her head closely adjacent the green and then visually scanned for nearby stragglers or ridges. Inspections at multiple locations inefficiently required the inspector assume the prone position at each location. This inspection method is time-consuming and awkward, and thus has supported a need for a simple and efficient device and method for evaluating turf for defects. In particular, a need has arisen for a device which permits an inspector viewing from above to visually scan for "stragglers," "ridges" or other defects without assuming the prone position. By visually scanning the turf for defects an inspector may qualitatively form an assessment of cutting unit performance. Furthermore, a need has arisen for a device which permits an inspector viewing from above to efficiently quantify the height of such defects.

The prior art discloses an optical tool that permits the visual measurement of turf height from above the device. Referring to FIG. 1, such a device 120, referred to as the OP-TIC-VU-ER and manufactured by Check Signature Incorporated, Shoreview, Minn., is shown. Device 120 includes a body portion 102 and an attached prism portion 106 and is hand-held and carried to a location where measurement is desired. Device 120 is then placed on the turf 112 with knife edge portions 110 and 108 directed downwardly. Device 120 is relatively massive to assist positioning knife edge portions 110 and 108 within the turf 112. A slight downward force may be used to situate the knife edge portions 110, 108 within the turf. Once positioned, the device 120 allows an inspector 100 viewing from above to visually inspect a small patch of the turf 112 through prism portion 106. Prism portion 106 provides substantial internal reflectance of sight line 114 to allow the inspector 100 to compare the turf 112 with measurement indicia 104 to determine the relative turf height 124, as depicted in FIG. 2. Measurement indicia 104 provides the successive vertical distance from knife edge 110, thus the turf height 124 is relative to the knife edge 110. A general limitation of this device 120 is that turf height evaluations made with this device 120 lacks a desired measure of repeatability. The source of the repeatability error is believed by the Applicants to result from the interaction between the knife edge portions 110, 108 and the turf 112. As depicted in FIG. 3, with an enlarged partial view of knife edge portion 110 of body portion 102 within turf 112, the device is shown as having been placed on the turf 112 with a given slight downward force. Body portion 102 may assume a position generally between the green matter portion 200 of turf 112 and a thatch/brown matter portion 202 of turf 112 by application of the slight downward positioning force and the relative large mass of the device 120. However, as a result of the knife edge structure and relative large mass of the device 120, the knife edge portion 110 may easily assume a lower position within the turf when placed with a slightly larger downward force. Such a lower position is evidenced in FIG. 3 with the knife edge portion at 110'. It is believed by the Applicants that a relatively slightly different downward force or technique in placing this device 120 on the turf 112 may lead to a dramatically different turf height measurement of the same turf. The repeatability of such a device 120 is thus heavily dependent on the force and positioning technique when placing the device 120 on turf to be measured. To compare relative turf heights at two locations with this device 120 importantly requires an inspector to duplicate the placement forces and technique when positioning the device. As a result, the accuracy of this prior art device 120 to measure turf height is largely dependent on the skill of and procedure followed by the inspector.

Furthermore, another limitation of prior art device 120 is that the device 120 permits evaluation only of the "local" turf zone 5 situated between the prism portion 106 and body portion 102. Device 120 does not permit the evaluation turf with a "global" zone 7, e.g., that turf situated away from the device 120 and not within the "local" zone 5.

A need exists for a device and method of use to efficiently and accurately view the turf from above for incongruities or defects, such as "stragglers" and "ridges." A need also exists for a device that may be used to visually scan from above for such turf defects within both a "local" and a "global" zone. The present invention addresses the problems associated with the prior art devices and methods.

SUMMARY OF THE INVENTION

An object of this invention is to provide an improved optical turf evaluation device and method of use for evaluating the appearance of turf for incongruities or defects, such as "stragglers," "ridges," or "bob marks." Evaluation of turf may be made upon both "local" and "global" turf zones. The device of the present invention includes an oriented mirror device allowing the user to visually scan the turf from above for defects, without assuming a prone position. Accordingly, one embodiment of the present invention includes a generally concavely shaped body and an attached oriented mirror device which when placed upon the turf may be used to evaluate the turf from above for turf within the "local" zone (within the boundary of the body and the mirror device). By rotating the first embodiment of the present invention the user may also evaluate turf within a "global" zone, i.e., that turf other than within the "local" turf zone.

In a preferred embodiment, the mirror device of the present invention includes a fixed single glass mirror including first and second reflective surfaces. In yet another embodiment the mirror device may include a single reflective surface that is rotatable between first and second positions to allow for "local" and "global" inspections of turf.

Yet another object of the invention is to provide a turf evaluation device that offers accurate and repeatable turf data to a user viewing from above.

Still yet another object of the present invention is to provide an inexpensive and durable turf evaluation device, that is simple to manufacture and maintain.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

The invention will be further described with reference to the Drawings, wherein:

With reference to the Drawings, wherein like reference numerals designate like parts and assemblies throughout the several views, FIG. 4 shows an exploded perspective view of a turf evaluation device 8. In its preferred form, device 8 basically includes a generally concavely shaped body portion 10, a mirror device 12, and a handle portion 82. Body portion 10 includes a generally rectangularly shaped plate member 62 and right and left extending arm portions 42(a, b). Mirror device 12 is attached to the body portion 10 of the device 8 at the ends of extending arms 42. Plate member 62 includes generally a flat top surface 61, a bottom surface 60 and a reference surface 68. Plate member 62 further includes four threaded apertures 64 for use in attaching extending arm members 64 to opposite ends of plate member 62. Plate member 62 further includes a threaded aperture 66 for use in attaching handle member 82 to plate member 62. Extending arm members 42 are substantially flat members projecting at approximate right angles from plate member 62, shown as angle β in FIG. 4. Extending arm members 42 include first and second arcuate surfaces (45, 43) along a portion of the outer periphery. Extending arm members 42 each further include three apertures 44 which permit light to pass therethrough and to facilitate operation of the device 8. Extending arm members 42 each further include a channel 46 for receiving and securing a portion of mirror device 12. Channel 46 in this preferred embodiment is oriented at an angle α, of approximately 45 degrees. Extending arm members 42 included non-threaded apertures 48 through which threaded fasteners 16 pass and are received into threaded apertures 64 of the plate member 62 to secure the extending arm members 42 to the plate member 62.

Figure 2:
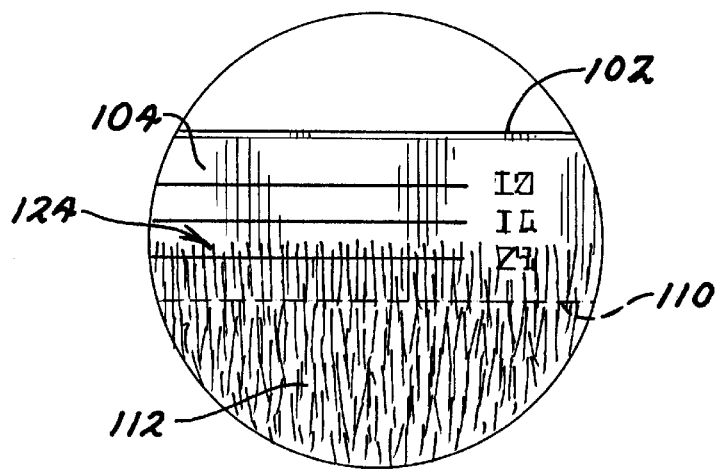
FIG. 2 is a depiction of a view presented to the user of the prior art device of FIG. 1.
Figure 1:
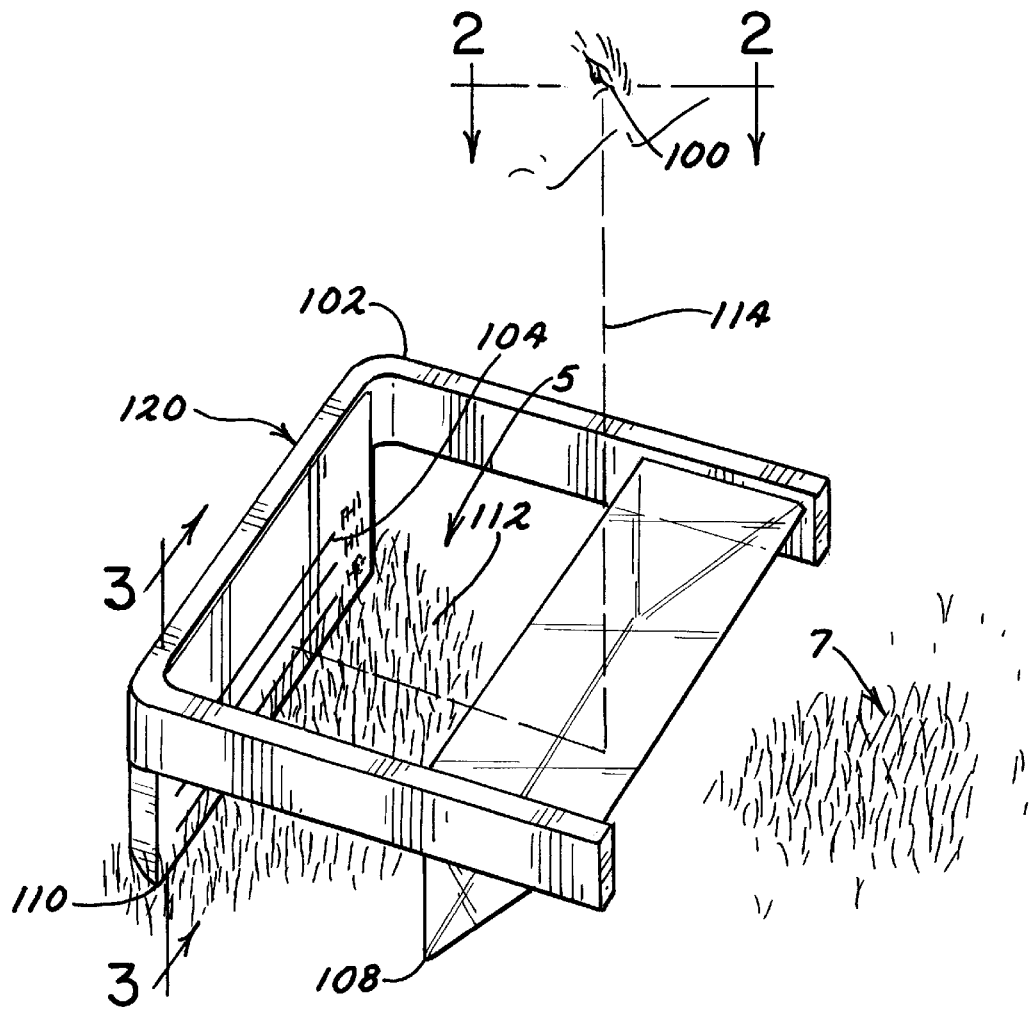
FIG. 1 is a perspective view of a prior art turf evaluation device.
Figure 3:
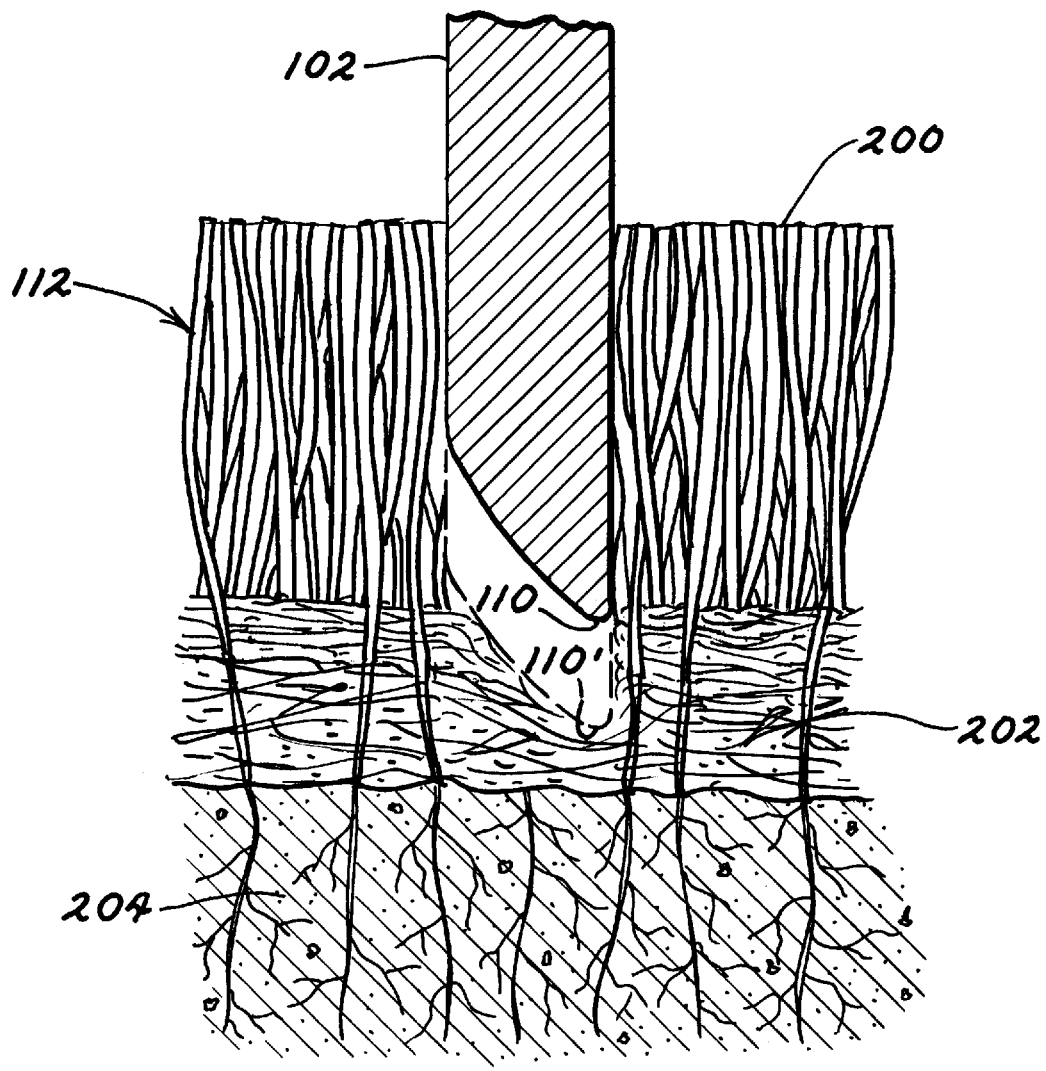
FIG. 3 is an elevational view of an enlarged portion of the device of FIG. 1.
Figure 4:
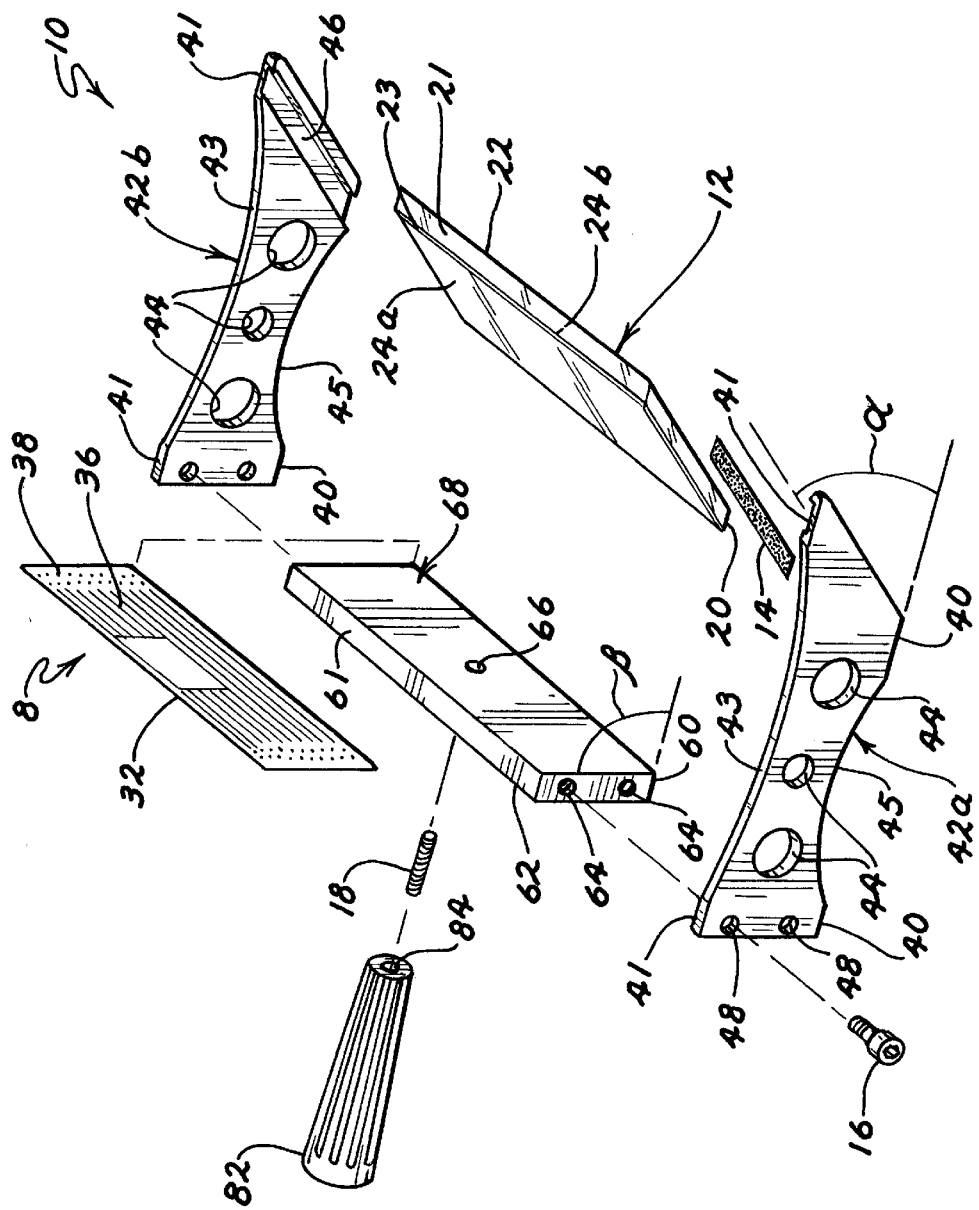
FIG. 4 is an exploded perspective view of a first preferred embodiment of the device according to the present invention.

Still referring to FIG. 4, the body portion 10 of the present invention 8 further includes turf resting surfaces (40, 41) for contact with a turf surface 112 during operation of the device 8 as described hereinafter. Turf resting surfaces (40, 41) of the preferred embodiment of the invention are positioned along opposite sides of extending arm members 42. A first turf resting surface 40 is shown in FIG. 4 at opposite ends of the first arcuate portion 45 of extended arm member 42a. A second turf resting surface 41 is shown at opposite ends of the second arcuate portion 43 of extended arm 42b. The turf resting surfaces 41 of opposed extending arm members 42a,b are substantially co-planar with the top side 61 of plate member 62 and the top side 21 of mirror 22. Similarly, the turf resting surfaces 40 of opposed extending arm members 42a,b are substantially co-planar with the bottom side 60 of plate member 62 and the bottom side 20 of mirror 22. Resting surfaces (40, 41) and top and bottom sides (61, 60) of plate member 62 and mirror 22 co-act to provide a stable base for positioning the turf evaluation device 8 during operation described herein later. Alternative configurations for such surfaces (40, 41, 60, 61) may include sharpened or knife-edge portions to facilitate device 8 operation.

Plate member 62 and extending arm members 42 are preferable formed from cold-rolled steel having thickness dimensions of 0.375 inch and 0.1793 inch, respectively. Overall the body member 10 is approximately 6 inches square in dimension.

Mirror device 12 of this preferred embodiment provides a pair of opposed reflective surfaces (24 a,b) to optically reflect light during operation of the evaluation device 8 as described hereinafter.

Mirror device 12 of the preferred embodiment preferably comprises a single glass mirror 22 including a single silvered layer 23 providing a first and second reflective surface (24a, 24b). Mirror 22 is preferably oriented at an angle, α, of approximately 45 degrees. Reflective surfaces (24 a,b) are provided at either side of silvered layer 23. First reflective surface 24a is generally directed inwardly toward the concavity of body member 10 at the preferred angle, α. Images reflected by the first reflective surface 24a are not distorted by optical refraction through glass mirror 22, whereas images reflected by the second reflective surface 24b may be distorted by refraction as a result of the air-glass optical transition. Silvered layer 23 is preferable positioned on the side of glass mirror 22 closer to plate member 62. Mirror device 12 may also include a single glass mirror 22 including two silvered layers, each at an outer surface. With such a two silvered surface mirror 22, refraction at the second reflected surface 24b would be eliminated. Mirror device 12 may also include a multi-part glass or plastic assembly providing first and second reflective surfaces. Mirror device 22 may also simply include a highly polished metallic plate.

Mirror device 12 is preferable attached to body portion 10 of the present invention 8 at the channels 46 of extending arm members 42. Adhesive stips 14 are positioned between the mirror device 12 and arm members 42 and within the channels 46 to relatively rigidly adhesively secure the mirror device 12 to the body portion 10 at the preferred angle, α.

Still referring to FIG. 4, a decal 32 is affixed to plate member 62 at reference surface 68. Decal 32 comprises indicia means including grille indicia 36 and numeric indicia 38 indicating vertical distance information from bottom surface 60 of plate member 62 upward toward top surface 61. Indicia (36, 38) may provide English or metric distance information. Grill indicia 36 is substantially parallely aligned with top and bottom surfaces (61, 60) of plate member 62.

To assist in handling the device 8 of the present invention, an outwardly projecting tapered handle 82 is preferable attached to the body portion 10. Handle 82 includes a threaded aperture 84 for threadedly receiving a portion of threaded fastener 18. Another portion of threaded fastener 18 is received into threaded aperture 66 of plate member 62 to secure the handle member 82 to the body 10 of the device 8.

Figure 6:
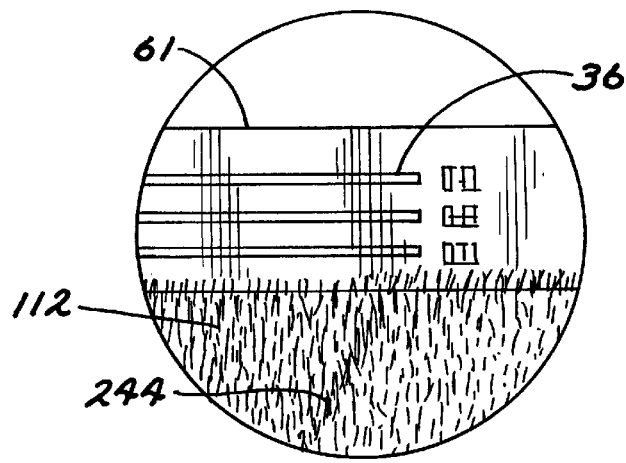
FIG. 6 is a depiction of a view presented to the user of the device of FIG. 5, illustrating a "ridge" type turf defect.
Figure 5:
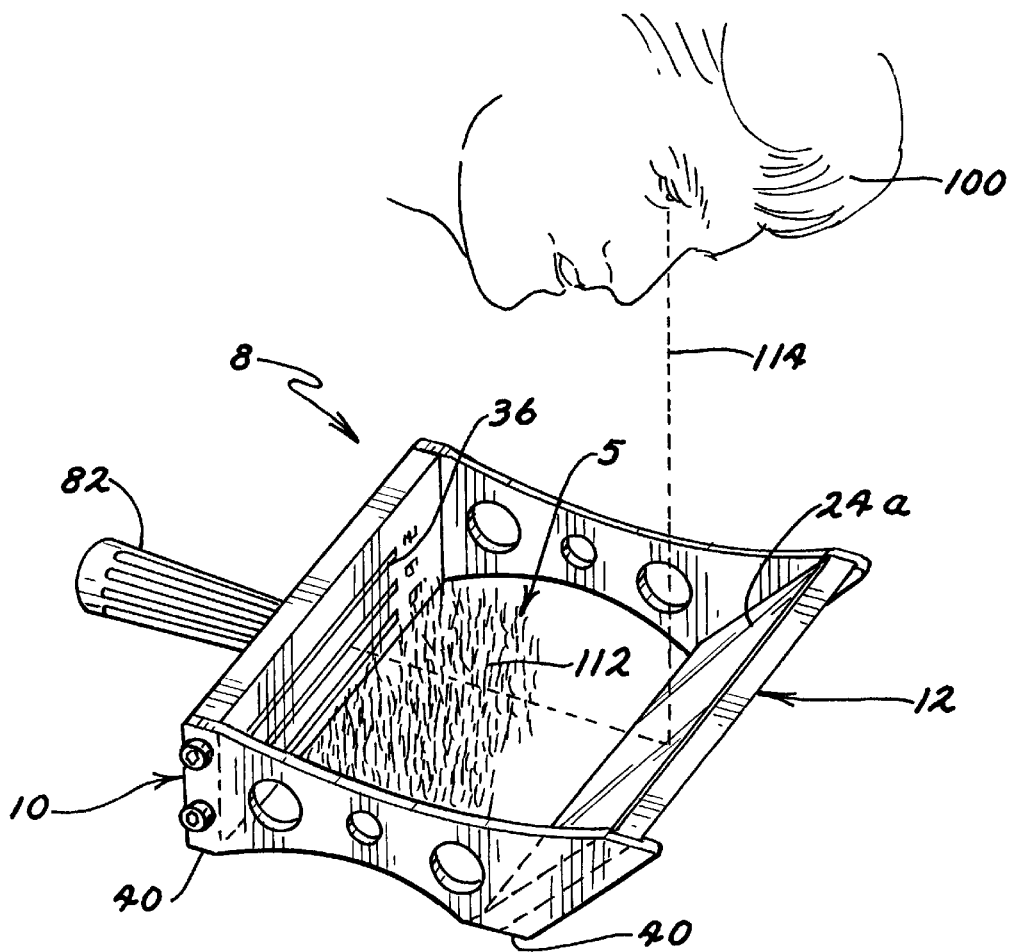
FIG. 5 is a perspective view of the device of FIG. 4 and a depiction of the device of FIG. 4 during use in a first preferred "local" mode of operation.

Operation of the device 8 to evaluate turf for defects will be discussed with reference to FIGS. 5–10. Evaluation of turf commences with the user 100 placing the device 8 on turf 112 as shown in FIGS. 5–6. The device 8 is placed on the turf 112 with a slight downward force on both arm portions 42 to seat resting surfaces 40 stably against the turf 112. Referring particularly to FIG. 5, the device 8 is shown positioned on turf 112 for use during a first preferred mode of operation, the "local" turf evaluation mode. While preferably kneeling, the user 100 positions his/her head substantially directed above the device 8 to provide a sight line 114 allowing the user 100 to visually scan the small patch of turf 112 within the "local" zone, designated numeral 5, substantially within the enclosed boundary provided by the body portion 10 and the mirror device 12. Such a visual scan is depicted in FIG. 6, wherein the user 100, viewing from above, is able to reflectively and collectively view the turf 112, the plate member 62, and indicia means (36, 38). Turf 112 discrepancies may be evidenced to the user 100 when viewed through the first reflective surface 24a of mirror device 12 in the first preferred mode of operation. As an example, the turf irregularity referred to as a "ridge" defect is shown as numeral 244 within the disparity of the heights of turf 112 existing laterally across the indicia means 36, 38. Numeric indicia 38 is reverse printed on label 32 so that when viewed through mirror device 12 the numeric indicia 38 is normally presented to the user 100. Relative differences between the height of turf 112 across the ridge 244 as viewed in FIG. 6 may be read from numeric indicia 38.

Figure 8:
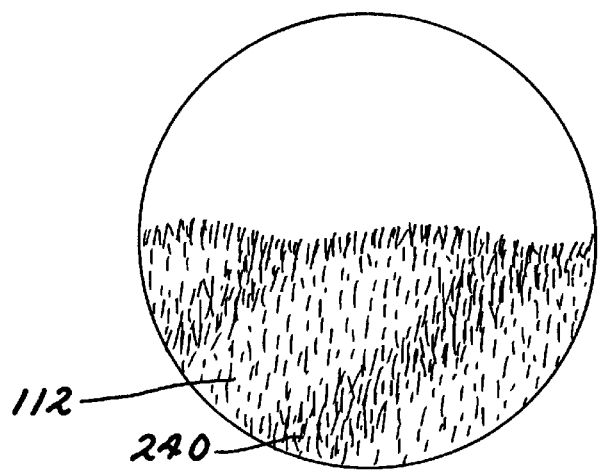
FIG. 8 is a depiction of a view presented to the user of the device of FIG. 5, illustrating a "bobbing" type turf defect.
Figure 7:
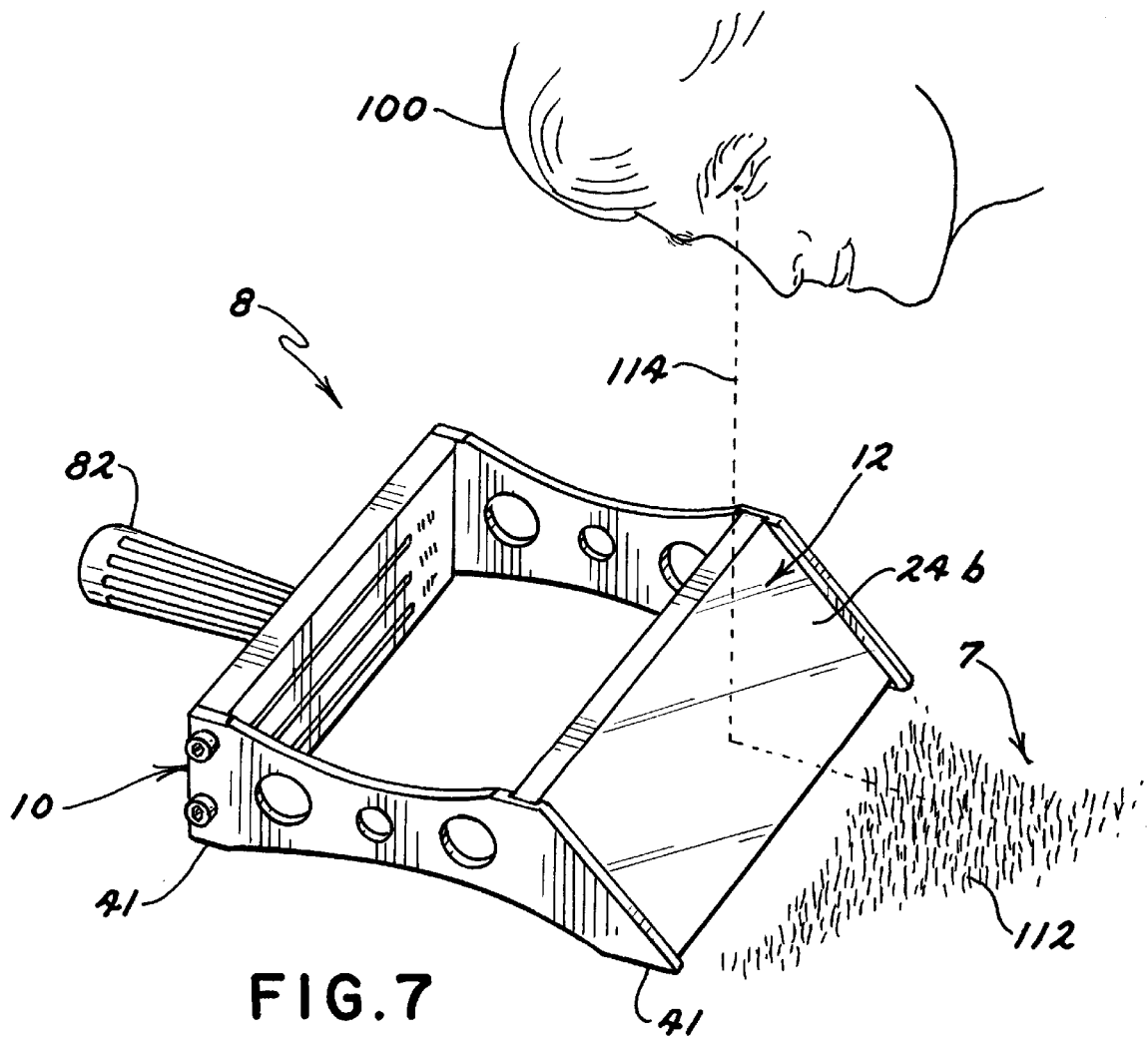
FIG. 7 is a perspective view of the device of FIG. 4 and a depiction of the device of FIG. 4 during use in a first preferred "global" mode of operation.

Operation of the present invention in a second preferred mode of operation is shown in FIG. 7. The second preferred mode of operation allows a user 100, preferably viewing from above, to visually scan for turf defects over a wider field of view, i.e., to perform a "global" inspection. Turf within a "global" turf zone, designated numeral 7, may be viewed by a user 100 preferably aligning his/her eyes generally above the second reflective surface 24b of the mirror portion 12 with the handle portion 82 of the device directed away from the user's body. FIG. 8 depicts the view presented to the user 100 during the second preferred mode of operation, showing turf 112 extending away from the second reflective surface 24b. The turf defect referred to as "bobbing" marks are shown in FIG. 8 as undulations of the height of turf 112, and are designated numeral 240.

Transferring between first and second preferred modes of operation of the device 8 is accomplished by rotating the device 8 about the handle 82 axis approximately 180 degrees such that either resting surface 40 or 41 stably maintain the device 8 adjacent the turf 112.

The preferred methods of operation of the surf evaluation device 8 of the present invention thus may accordingly be carried out as follows:

1. securing the device 8 including the body portion 10 and oriented mirror device 12 including first and second reflective surfaces (24a,b);
2. transporting the device 8 to a location where turf inspection is desired;
3. determining whether a "local" or "global" inspection mode is desired;
4. placing the device 8 upon the turf 112 with resting surface 40 generally adjacent the turf 112 for the "local" inspection mode, or resting surface 41 generally adjacent the turf for the "global" inspection mode;
5. positioning the user's body to provide a line of sight generally directly above mirror device 12;
6. performing a visual scan of turf viewed through the mirror portion 12 by motioning the user's head;
7. comparing the turf 112 with indicia means (36, 38), as necessary, during the "local" inspection mode; and
8. transferring between preferred modes of operation, if desired, by rotating the device 8 approximately 180 degrees.

Figure 9:
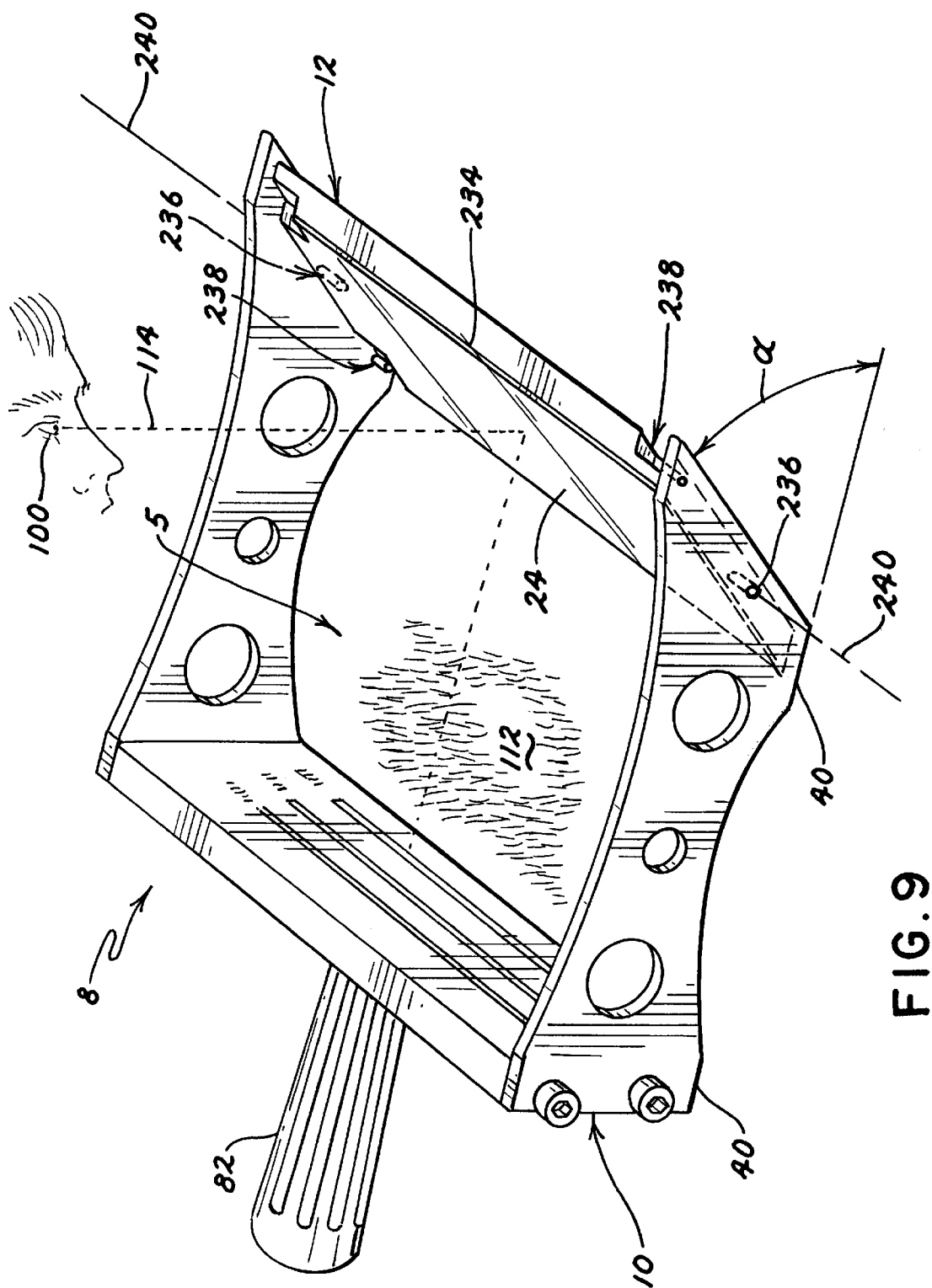
FIG. 9 is a perspective view of a second embodiment of a device according to the present Invention.

FIG. 9 shows another embodiment of the present invention 8. A second embodiment of mirror device 12 includes a glass mirror 234 having a single reflective surface 24. Mirror 234 is rotationally affixed to body member 10 across extending arm members 42a,b through rotary joint means 236. Rotary joint means 236 may include a pin or other suitable rotary bearing surface allowing mirror 234 to rotate about an axis 240 substantially parallely aligned with plate member 62. Mirror 234 may be rotationally indexed and maintained at the preferred angle, α, through index means 238. Index means 238 may include a pin or tab contacting a portion of mirror 234. Alternatively mirror 234 may be maintained at a preferred angle, α, through frictional contact with extending arm members 42. FIG. 9 shows the second embodiment of the device 8 with reflective surface 24 allowing the user 100 to visually scan the local turf zone 5. By rotating the mirror approximately 180 about axis 240 and rotating the device 8 by approximately 180 degrees about the handle 82 axis, the second "global" inspection mode may be initiated (as the reflective surface 24 of the mirror means 12 would be similarly oriented as the second reflective surface 24b of the first preferred embodiment). Rotary mirror 234 may be a single glass mirror or simply a polished steel mirror. Rotary mirror device 12 shown in FIG. 9 preferably allows the use of a single reflective surface mirror.

Although several preferred embodiments of the present invention have been illustrated and described, it will at once be apparent to those skilled in the art that still other variations may be made within the spirit and scope of the invention. Accordingly, it is intended that the scope of the invention be limited solely by the scope of the hereafter appended claims and not by any specific wording in the foregoing description.

We claim:

1. An apparatus for use in visually inspecting turf for local and remote irregularities, the apparatus comprising:
   a) a body structure including a first turf-engaging surface and a second turf-engaging surface for supporting the body structure upon turf in a first inspection orientation and a second inspection orientation, respectively; and
   b) a reflector secured to the body structure and positioned to provide at least a partial view of a local segment of the turf disposed between the reflector and a portion of the body structure to a user viewing from above the body structure when the body structure is in the first inspection orientation, and further positioned to provide at least a partial view of a remote segment of the turf disposed remotely from the body structure to the user viewing from above the device when the body structure is in the second inspection orientation.

2. The apparatus according to claim 1 wherein the reflector is a single mirror having opposed first and second reflective surfaces and is fixedly secured to the body structure.

3. The apparatus according to claim 1 wherein the body structure includes a rear plate member and a pair of arm portions attached to and extending from the rear plate member, wherein at least portions of the first and second turf-engaging surfaces are formed on the arm portions.

4. The apparatus according to claim 3 wherein the mirror is secured to the body structure between the pair of arm portions, and wherein the local segment of turf is contained between the pair of arm portions when the body structure is in the first inspection orientation.

5. The apparatus according to claim 4, further comprising:
   indicia secured to the body structure for indicating vertical distance, the indicia being visible to the user in combination with the local turf when the body structure is in the first inspection orientation.

6. An inspection tool for use in visually examining a surface for irregularities, the inspection tool comprising:
   a) a body member having a plurality of surface-engaging faces for supporting the body member stably upon the surface in a first inspection position and second inspection position; and
   b) a reflector coupled to the body member such that when the body member is in the first inspection position the reflector is positioned to provide a view at a vantage point away from the body member of at least a local segment of the surface between the reflector and a portion of the body member, and such that when the body member is in the second inspection position, inverted with respect to the first inspection position, the reflector is positioned to provide a view at the vantage point of a remote segment of the surface spaced remotely from the body member.

7. The inspection tool according to claim 6 wherein the reflector includes opposed first and second reflective surfaces and is fixedly secured to the body member.

8. The inspection tool according to claim 6 wherein the reflector has a single reflective surface and is pivotally secured relative to the body member.

9. The inspection tool according to claim 6 wherein the body member includes a rear plate member and a pair of arm portions attached to and extending from the rear plate member, wherein at least portions of the surface-engaging faces are formed on the pair arm portions.

10. The inspection tool according to claim 9 wherein the reflector is secured to the body member between the pair of arm portions, and wherein the local segment of the surface is contained between the pair of arm portions when the body member is in the first inspection position.

11. The inspection tool according to claim 10, further comprising:
    indicia secured to the body member for indicating vertical distance, the indicia being visible to the user in combination with the local surface segment when the body member is in the first inspection orientation.

12. An apparatus for visual inspection of a surface at an inspection location, the surface having local and remote surface irregularities, the apparatus comprising:
    a) a body member including a first turf-engaging surface and a second turf-engaging surface for supporting the body member upon turf in a first inspection orientation and a second inspection orientation, inverted with respect to the first inspection orientation, respectively; and
    b) a reflector coupled to the body member and rotatable between a first reflector orientation and a second reflector orientation, such that when the reflector is in the first reflector orientation and the body member engages the turf, the reflector provides to a viewer positioned above the body member at least a partial view of a local segment of the turf disposed between the reflector and a portion of the body member, and such that when the reflector is in the second reflector orientation and the body member engages the turf, the reflector provides to a viewer at least a partial view of a remote segment of the turf disposed remotely from the body member.

13. The apparatus according to claim 12 wherein the body member includes a rear plate member and a pair of arm portions attached to and extending from the rear plate member and the reflector is operatively coupled to the body member between the pair of arm portions.

14. The apparatus according to claim 13 wherein the reflector is rotatable relative to the body member about an axis of rotation, wherein the rear plate member is generally planar in configuration, and wherein the axis of rotation and the rear plate member are substantially parallely aligned.

15. The apparatus according to claim 13 wherein the reflector is a single mirror.

16. The apparatus according to claim 15, further comprising:
    indicia secured to the body member for indicating vertical distance, the indicia being visible to the user through the mirror when the mirror is in the first orientation.

17. A method of using an inspection tool for visually inspecting turf for local and remote surface irregularities, said method comprising the steps of:
    a) situating the inspection tool on the turf at a selected inspection location in a first inspection orientation;
    b) viewing from above the turf inspection tool through the reflector to visually inspect for surface irregularities spaced between the reflector and at least the portion of the inspection tool;
    c) situating the body member of the turf inspection tool on the turf at the selected inspection location in a second inspection orientation inverted with respect to the first inspection orientation; and
    d) viewing from above the turf inspection tool through the reflector to visually inspect for surface irregularities spaced remotely distant from the body member.

* * * * *